United States Patent Office 3,318,232
Patented May 9, 1967

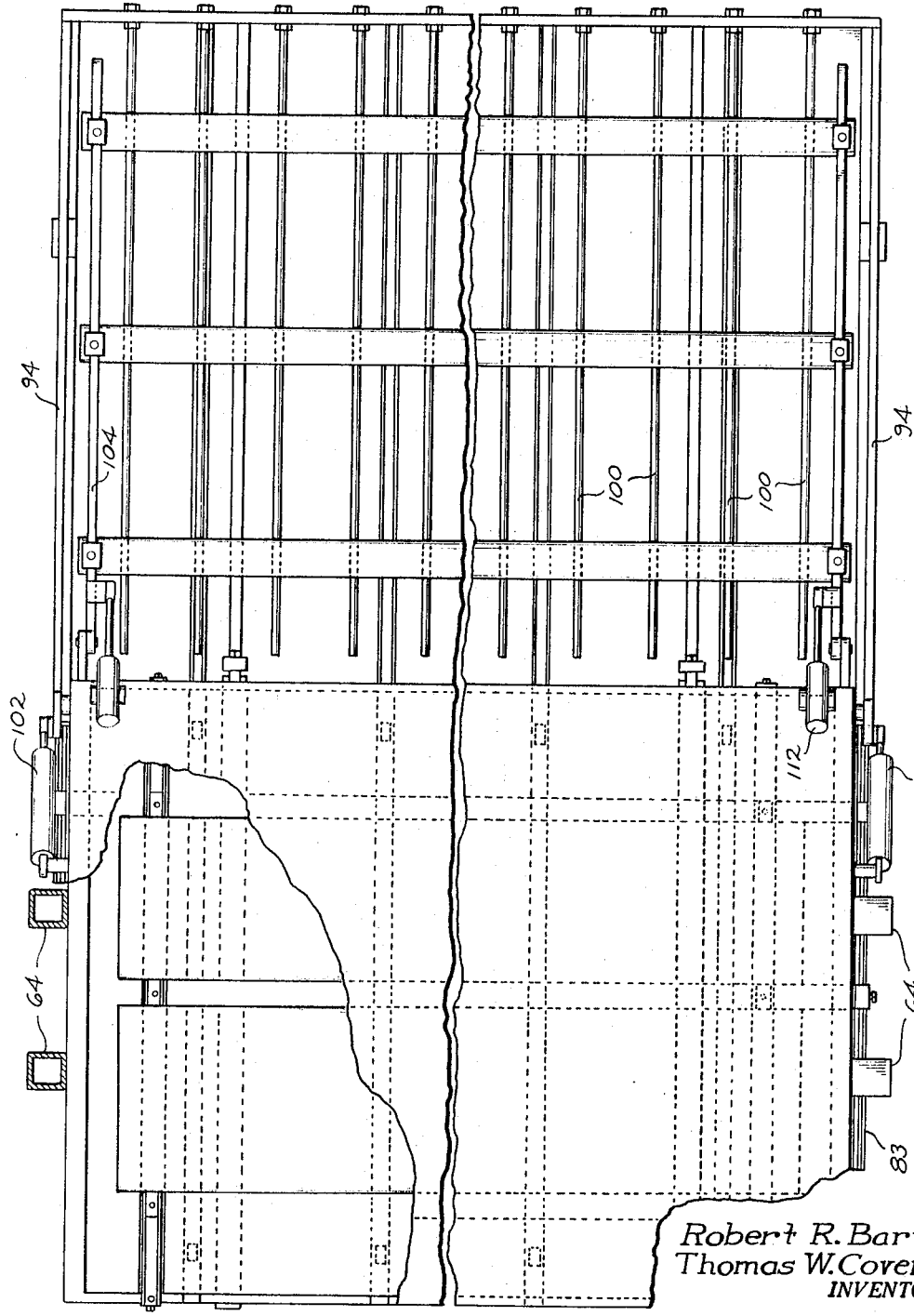

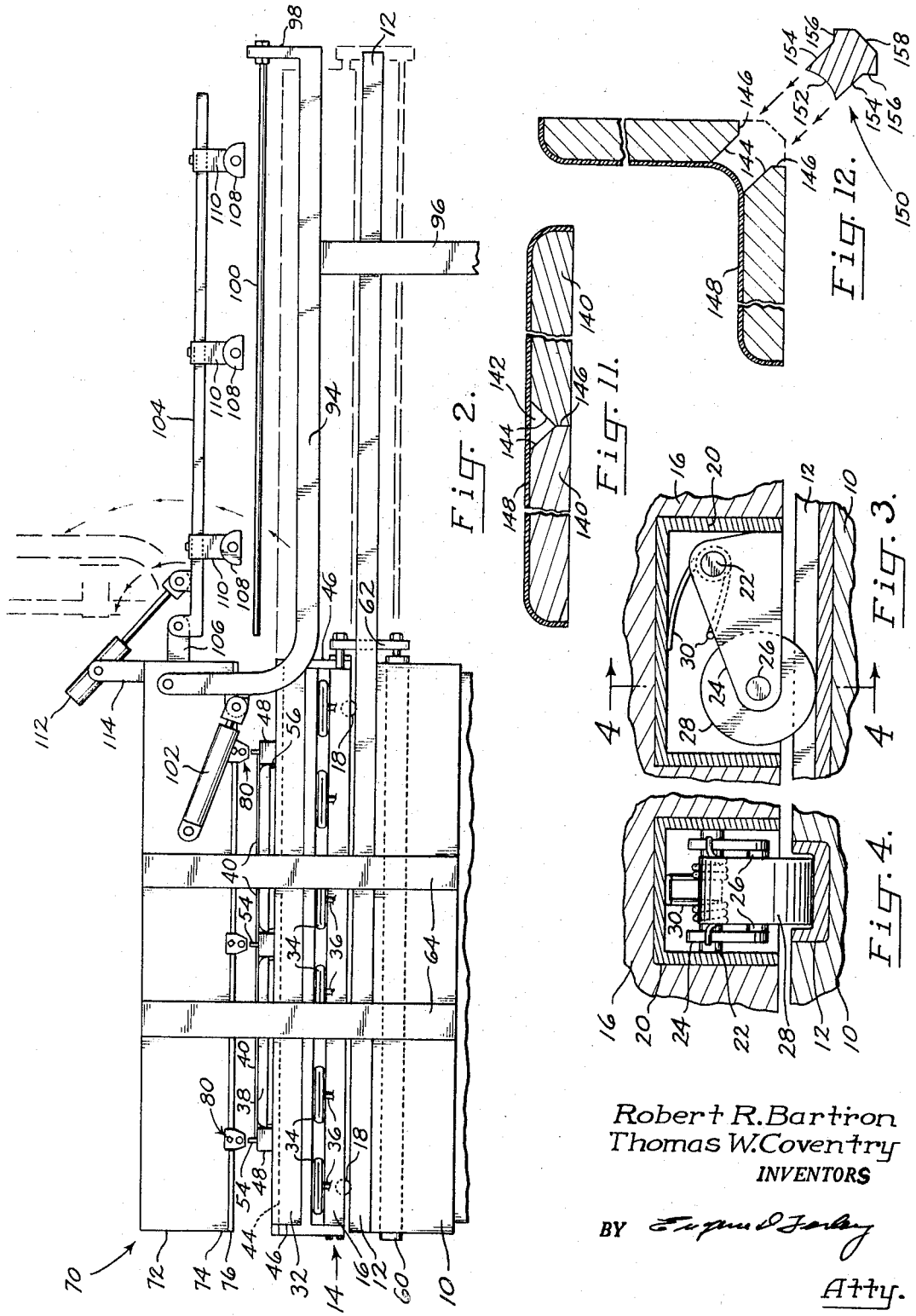

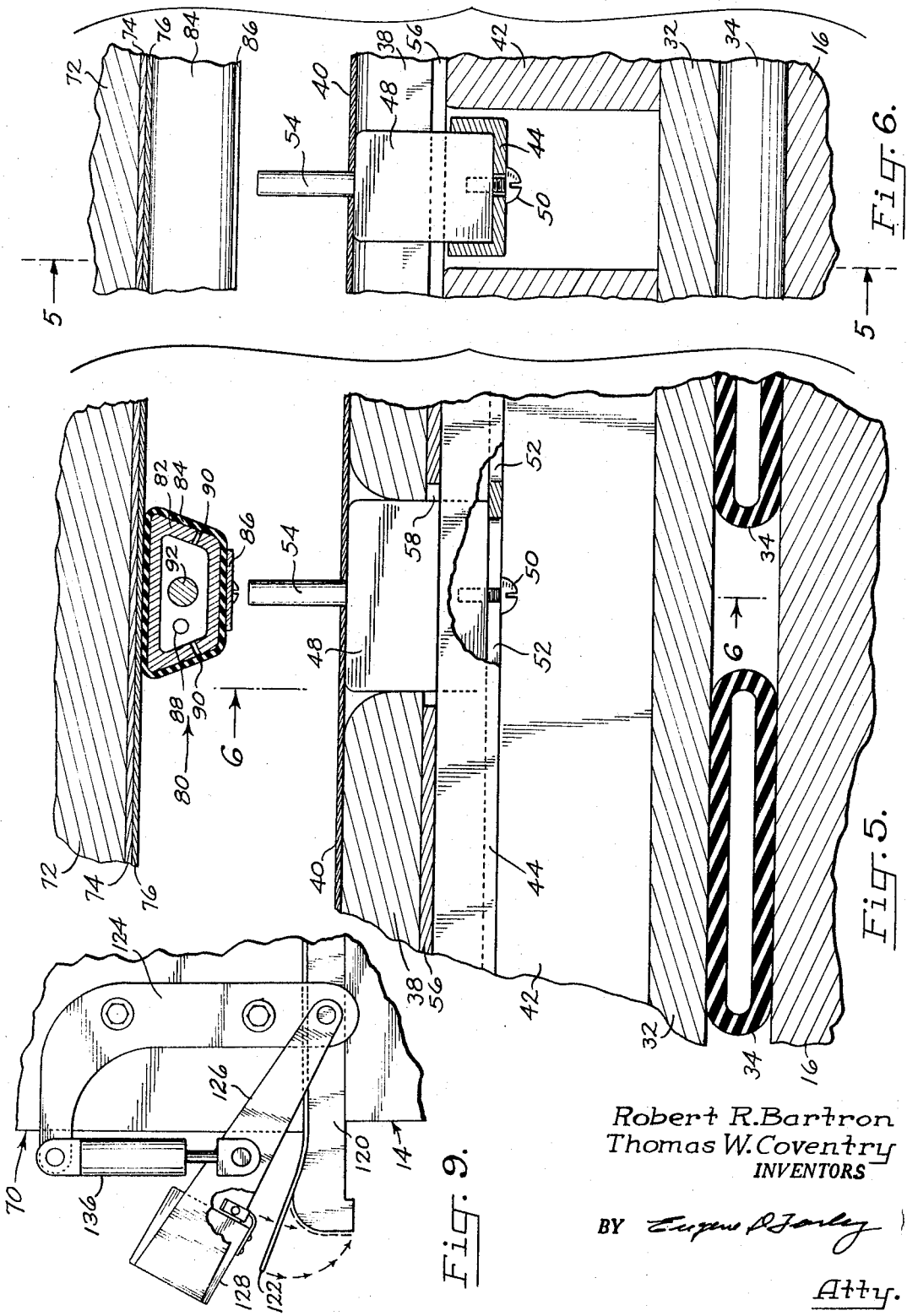

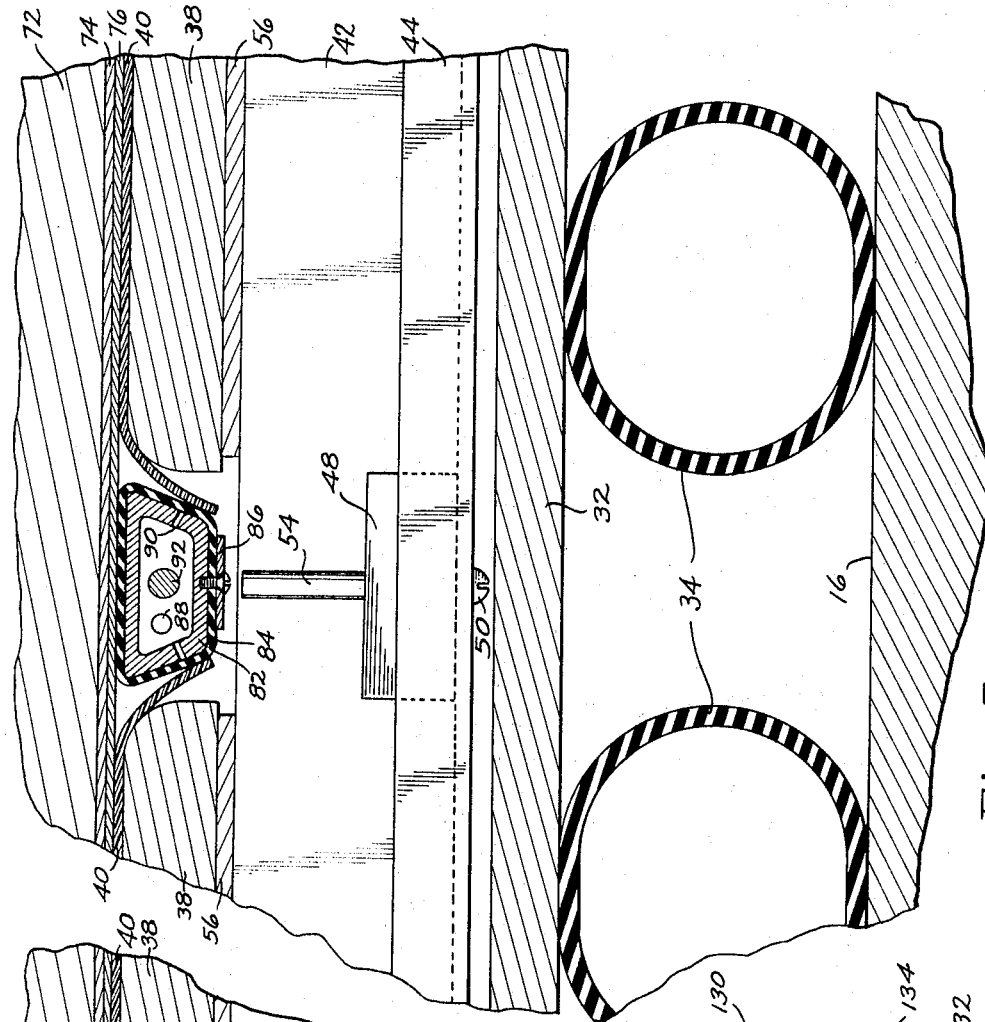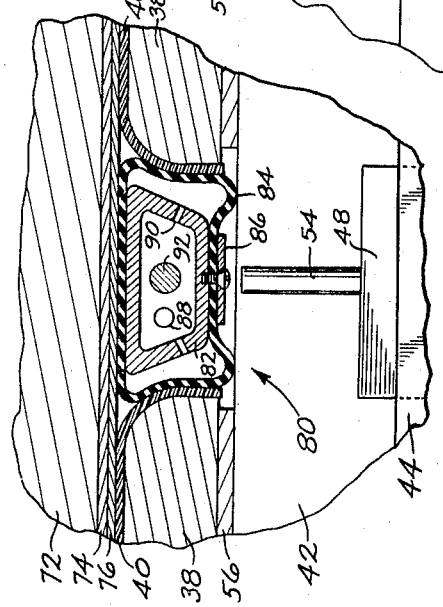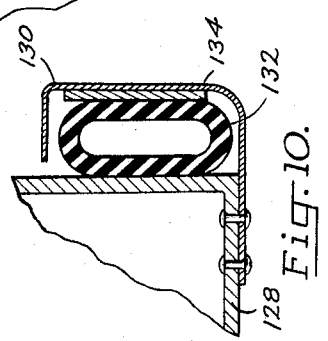

3,318,232
APPARATUS FOR FORMING SHEET PLASTIC AND LAMINATING IT TO AN UNDERLAYMENT
Robert R. Bartron, 8210 Steilacoom Blvd., Tacoma, Wash. 98498, and Thomas W. Coventry, 78—1220 Cardero St., Vancouver, British Columbia, Canada,
Filed Apr. 29, 1963, Ser. No. 276,330
10 Claims. (Cl. 100—93)

This invention relates to apparatus for forming sheet plastic and laminating it to an underlayment.

Such articles as countertops, drainboards and the like presently to a large extent are tailor made by the carpenter or cabinet maker for each proposed installation. This involves a tedious and expensive piecing together of the underlayment and other structural components, followed by the step of applying sheet plastic to form the finished surface. The particular procedure employed are varied depending, inter alia, upon whether the countertop is to have a squared or bull-nosed outer edge, whether it is to be provided with a coved back splash panel, and whether it is to be provided with a raised no-drip front margin.

It is the general purpose of the present invention to provide apparatus for prefabricating at a highproduction rate on a large construction scale, and at relatively low cost, large panels comprising an underlayment surfaced with sheet plastic. These panels then may be used in the manufacture of counter tops, drainboards, kitchen cabinet doors, cabinet end panels, cabinet aprons, cabinet stiles, wall panels, sliding doors, and the like.

It is a further important object of the present invention to provide apparatus for manufacturing panels of the class indicated above which panels may be formed with bullnosed margins and integral coved back splash sections so that the panels may be employed in a wide variety of counter top, drainboard and cabinet applications.

Still another object of the present invention is the provision of apparatus for forming sheet plastic and bonding it securely to an underlayment, the plastic being applied flat or radiused, in a single, easily and rapidly effectuated operation, and in a single machine.

A further object of this invention is the provision of an apparatus for manufacturing countertops, drainboards and the like provided with integral, coved, back splash panels positioned at a predetermined angle to the counter top, usually at an angle of 90°, wherein the desired angle may be established easily, rapidly and with a high degree of accuracy.

The manner in which the foregoing and other objects of this invention are accomplished will be apparent from the accompanying specification and claims considered together with the drawings, wherein:

FIGS. 1 and 2 are views in plan and side elevation, respectively, of the apparatus of the invention in one of its embodiments, FIG. 1 being partly broken away better to show the underlying structure;

FIGS. 3 and 4 are detail longitudinal and transverse sectional views, respectively, FIG. 4 being taken along line 4—4 of FIG. 3, illustrating a wheeled mounting unit for a press element employed in the apparatus of FIGS. 1 and 2;

FIGS. 5 and 7 are inlarged, detail, sectional views taken along line 5—5 of FIG. 6, longitudinally with respect to the direction of travel of the work in the apparatus, illustrating the construction of the plastic forming and laminating mechanism, FIG. 5 being in the open position of the press and FIG. 7 in the closed position thereof;

FIG. 6 is an enlarged, detail, transverse, sectional view taken along line 6—6 of FIG. 5;

FIG. 8 is a view similar to FIG. 7 but further illustrating the operation of the apparatus in forming a plastic sheet about a bullnosed panel margin;

FIG. 9 is a view in side elevation of an attachment which may be mounted on the press of FIGS. 1–8 and employed for forming a plastic sheet about a raised and radiused no-drip marginal section of a counter top or other unit;

FIG. 10 is an enlarged, detail, fragmentary, sectional view further illustrating the construction of the sheet-forming unit of FIG. 9;

FIG. 11 is a foreshortened end view of a plastic-covered panel produced by the presently described apparatus and method, the panel being of the type adaptable for use in the construction of a drainboard having an integral back splash section; and FIG. 12 is a foreshortened end view similar to FIG. 11 but illustrating further the manner of forming and maintaining the back splash section.

An exemplary form of the herein-described apparatus is illustrated in detail in FIGS. 1–8 inclusive.

As indicated particularly in FIGS. 1 and 2, the apparatus basically comprises a platen-type press provided with work locating and loading means, and with heating means for softening a plastic sheet as required to laminate it to an underlayment as well as to radius it to a bullnosed edge on the latter.

The press is mounted on a base 10 which underlies a plurality of parallel, spaced rails 12 extending longitudinally of the unit, with reference to the direction of travel of the work therein.

Base 10 also supports a pair of platen units which may be moved toward and away from each other as required to press the assemblies introduced between them.

The lower platen unit is indicated generally at 14. It comprises two vertically collapsible sections, the lower section 16 mounts the unit and has an under surface provided with a plurality of recesses in each of which is located a spring pressed wheel assembly indicated generally at 18.

As will appear hereinafter, the spring pressed wheel assemblies serve the function of enabling withdrawal of the lower platen unit from the press for loading purposes. They also permit retraction of the wheels into the body of the platen when the latter is involved in the pressing operation.

The construction of the wheel assemblies is illustrated in detail in FIGS. 3 and 4.

A housing 20 is secured in the platen recess and mounts a transverse shaft 22. The shaft, in turn, suports pivotally a pair of parallel spaced plates 24. Journaled between the outer ends of the plates is a wheel shaft 26 which mounts rotatably a wheel 28 sized to track in track 12. A spring 30 is coiled about pivot shaft 22 and suitably arranged for pressing the wheel resiliently outwardly. As a consequence, the lower platen assembly normally is spaced vertically from base 10 so that it may be wheeled outwardly for loading. However, when pressure is applied during the pressing operation, the wheels retract within housing 20 so that a suitable and reproducible press pressure may be attained and maintained.

Also included in the lower platen assembly is a top section 32 which registers with the lower section but is spaced vertically therefrom. It floats, and is the means by which pressure is applied to the work.

The pressure is applied by a plurality of collapsible, pneumatic tubes 34 which are closed at each end and to which air is supplied, and from which it is exhausted, by ducts 36. When air is supplied to the tubes, upper floating section 32 of the lower platen is elevated, applying pressure to the work and at the same time causing the retraction of wheels 28. When air is exhausted from the tubes, the upper section gravitates downwardly, releasing the pressure and permitting the resilient extension of wheels 28.

Adjustable means are provided on top section 32 of the lower platen for locating on the upper surface of the platen one or a plurality of the assemblies to be pressed. As indicated above, each of these assemblies may comprise a lumber, plywood, flakeboard, or particle board underlayment or base 38 which may have bull-nosed longitudinal side edges, and a thermoplastic sheet 40 superimposed on the underlayment, there being an interposed layer of suitable adhesive between the two elements of the assembly.

Also, each assembly may be of substantial size, for example, 4 feet wide and 12 feet long, and of variable width and length as required for a particular application.

It is a particular feature of the invention that means are provided for locating a number of the assemblies properly on the press, such means being adjustable to accommodate assemblies of varying width.

To this end, floating platen section 32 is formed with a plurality of spaced, longitudinally extending, parallel slots 42 (FIGS. 5 and 6). Extending longitudinally of each slot is a channel bar 44 supported at each end by an upright 46. The lower end of each upright is bolted to the bottom section 16 of the lower platen. Accordingly it is fixed and may serve the ancillary function of containing and guiding the floating upper section 32 of the platen.

Into channel 44 are pressed releasably a plurality of spacing blocks 48. These may be secured in the selected position by screws 50 (FIGS. 5 and 6). The screws slide in slots 52 formed in the bottom of the channels and accordingly afford a convenient means of fixing spacing blocks 48 in any desired location, as may be indicated by a suitable index located on the side of the apparatus.

Spacing blocks 48 serve as abutments for locating and spacing adjacent underlayment units 38. Means also are provided for locating and spacing the superimposed plastic sheets 40.

Such means may comprise, for example, a vertically extending peg 54 located centrally of the top surface of each spacing block, thus providing a substantial overlap of the plastic sheet with reference to the underlayment. This provides the material necessary for forming about the bull-nosed side margins of the latter.

When forming the plastic sheet about the rounded margins of the adhesive-coated underlayment, a problem is presented in that the surplus adhesive tends to run down under the underlayment, fouling the surface of the product. Accordingly there are provided on the surface of upper platen sections 32 a plurality of filler sheets 56. These conform substantially in contour to the contour of the underlayment sheets, but are slightly narrower, so that spaces 58 are provided along each edge. These spaces then form small reservoirs which accommodate the surplus adhesive.

Drive means are provided for reciprocating the entire lower platen assembly 14 between a working position, which is the full line position of FIG. 2, and a loading position which is the dotted line position of that figure.

A long fluid-operated cylinder 60 is mounted in base 10 of the press, parallel to tracks 12. The piston rod of the cylinder is coupled through a link bar 62 to lower platen section 16. Accordingly, extension of cylinder 60 will move the entire lower platen assembly to its loading position outside the press, while retraction of the cylinder will return it to its working position, inside the press.

Extending upwardly from, and supported by, base 10 of the press are vertical uprights 64. These serve as support members for the upper platen 70 of the press. They also serve the secondary function of containing and guiding floating platen section 32 of the lower press platen.

The upper platen includes a substantial base 72 across the face of which is mounted a planar heating element or heat blanket 74 which assists in maintaining plastic sheet 40 at the proper temperature during the forming operation. A metal face sheet 76 is superimposed across heating element 74.

Also included in the upper platen assembly are a plurality of forming bars indicated generally at 80. These have for their functions forming the sheet plastic around the curved edges of the underlayment, and holding the plastic pressed against the underlayment until the adhesive has set. The construction of the forming bars is indicated particularly in FIGS. 5, 7 and 8.

A hollow bar 82 is mounted slidably on rods 83 which are supported on upper platen base 72. It is closed at both ends and is encased in an expandable rubber sheath 84. To direct the expansion of the sheath laterally, its underside is maintained pressed against the bottom of bar 82 by means of a plate 86 bolted to the bar.

Air is introduced into the interior of hollow bar 82 through port 88 and is dispersed behind expandable rubber sheath 84 through openings 90. An electric heating element 92 extends the length of the bar interior for maintaining the assembly at the temperature required to maintain the plastic in a deformable state.

To facilitate loading of the press as required to maintain a high production rate, and to heat the plastic sheet in a preliminary heating stage in the areas of deformation, there is provided the combination loading and heating unit illustrated in FIGS. 1 and 2.

Tracks 12 on which lower platen assembly 14 reciprocates underlie a plastic-sheet-holding assembly supported on a frame which includes a pair of curved arms 94. The inner ends of the arms are pivoted to the base 72 of the upper platen unit. A pair of legs 96 extend downwardly, one from each arm, and a vertical face plate 98 is secured across the ends of the arms.

The face plate, in turn, supports a plurality of parallel, spaced, horizontal rods 100 which are dimensioned to receive and support a large, flat plastic sheet.

To move the plastic rack assembly out of the way during loading of the press, there are provided a pair of fluid operated cylinders 102, one on each side of the rack. These pivotally interconnect the base 72 of the upper platen and the vertical section of curved arms 94. Their operation moves the rack from its full line working position of FIG. 2 to its elevated dotted line position of the same figure.

To heat predetermined areas of the plastic sheet, there is operated in conjunction with plastic holding rack a lamp-holding rack supported on a pair of parallel, horizontal bars 104. The inner ends of these bars are pivoted to supports 106 extending laterally from upper platen base 72. A plurality of heating elements such as heat lamps 108 are fixed to brackets 110 which in turn are slidably mounted on the outside ones of support bars 104.

In practice, a sufficient number of heat lamps are provided to supply one lamp opposite each of the plastic sheet areas which must be heated sufficiently to permit deformation of the sheets during the forming operation. Where, as illustrated, there are to be prepared two plastic covered panels arranged side by side three heat lamps are required, one for each of the two outside margins and one for the central margins of the plastic sheets to be superimposed on the underlayments.

The entire lamp rack may be moved between the full line working position and the dotted line loading position by means of a pair of fluid operated cylinders 112 pivotally mounted in trunnions 114 extending upwardly from base 72 of the upper platen, and pivotally connected to bars 104.

Where the press is to be applied to the manufacture of drainboards or countertops having a raised and radiused margin which serves as a no-drip edge, the press unit may be provided with the attachment illustrated in FIGS. 9 and 10. It comprises broadly an ironing unit which serves the functions of ironing the margin of the plastic sheet about the raised and curved surface to be covered, and holding the plastic in place until the adhesive has set, thus bonding it securely to the underlayment.

Thus in the embodiment of FIGS. 9 and 10 there may be provided an underlayment 120 of characteristic cross sectional configuration. The upper surface of the underlayment is covered with adhesive and carries an applied plastic surface sheet 122, the margin of which has been heated to a deforming temperature in a preliminary operation. As shown in the drawings, this assembly is so positioned that it extends laterally outwardly beyond the sides of the press. It is clamped in this position between lower platen 14 and upper platen 70.

The ironing unit is supported by a pair of arcuate supports 124 bolted in upper platen 70 in such a manner that the ends of the support project beyond the plane of the side and face of the platen.

To the projecting lower end of each support is pivoted one end of an arm 126. The other or outer end of each arm supports one end of a transversely arranged ironing bar 128 which extends the full width of the apparatus parallel to the margin of plastic sheet 122 to which it is to be applied.

The ironing bar in turn supports a resiliently mounted contact strip 130, which is reversely bent in the illustrated fashion, with one end riveted to the underside of the ironing bar. The strip may be made of spring steel or similar resilient metal. Its upper end is unattached and spaced from its support.

Inside the housing created by the side wall of the ironing bar and the walls of contact strip 130 there are mounted pneumatic means for applying pressure to the inside of the strip and heating means for maintaining the strip at a temperature sufficiently elevated to maintain the plastic workable as it is ironed about the edge of the underlayment.

In the illustrated form of the invention the pressure applying means comprises a pneumatic tube 132, the ends of which are closed but connected to a source of air under pressure. The heating means comprises a flat heating element 134 fixed to the front wall of the contact strip.

Adjustment of bar 128 between its advanced working position and its retracted position is accomplished by application of a pair of fluid operated cylinders 136, the base of which is coupled to the laterally extending portion of support 124 and the piston rod of which is connected to arm 126.

The apparatus above described is versatile and may be applied with but minor adjustments to the production of countertops, drainboards, and other plastic covered panels of desired types.

In its operation, the plastic sheet support rack, including arms 94, and the lamp rack, including arms 104, are elevated to their out-of-the-way, loading position by operation of cylinders 102, 112 respectively. Lower platen unit 14 is moved to its loading dotted line position of FIG. 2 by operation of cylinder 60. Spacing blocks 48 are set in channels 44 in laterally extending rows, separated by a distance determined by the width of the panels to be made. Lamps 108 are set to a corresponding distance. Adhesive coated underlayament 38 then are loaded directly onto the platen, being supported by filler sheets 56. The plastic rack mounted on arms 94 then is lowered to its loading position and plastic sheets 40 placed upon rods 100. Proper positioning of the plastic sheets is attained by abutting them against posts 54 which extend upwardly from spacing blocks 48 to such a height that they extend above the plane of rods 100.

The lamp rack assembly, including lamps 108, then is lowered by operation of cylinders 112 into working position and the plastic heated in the areas which it is desired to soften.

Cylinder 60 again is actuated, this time to retract lower press unit 14 into the press. As it moves, posts 54 act as pushers pushing the plastic sheet off rods 100 and positioning them accurately on the underlayments so that when the assemblies are in the press, they are arranged as indicated in FIG. 2, and more specifically in FIG. 5.

The press now is closed by inflating pneumatic tubes 34, thereby raising floating upper section 32 of the lower platen from its lowered position of FIG. 5 to its elevated position of FIG. 7. Spacing blocks 48 do not participate in this movement since they are mounted in channels 44 which in turn are supported on arms 46 fixed to the stationary lower section 16 of the lower platen. The entire platen, however, is depressed until it is in firm contact with the supporting structure by retraction of spring pressed wheels 28 into the housing in which they are mounted.

Adequate pressure thus is applied to the assembly to press the plastic sheets firmly against the surface of the underlayments, bonding them thereto. At the same time, the margins of the plastic which overlie and extend beyond the bullnosed edges of the underlayment are formed around the latter and adhesively united to it by the operation of forming bars 80.

In the first stage of this operation, the plastic edges are deformed by the forming bars to the position of FIG. 7. Subsequently air is introduced into the interior of the forming bars, expanding resilient sheaths 84 so that the effect of FIG. 8 is produced, the sheath expanding laterally and applying pressure to the plastic as required to press it against the rounded edges of the underlayment. During these operations the plastic is maintained at a forming temperature by heat blanket 74 in the upper platen, as well as by heating elements 92 in the forming bars.

In the event that excess adhesive is squeezed out of the assembly, this is accommodated in reservoirs 58 which are created by filler sheets 56.

At the conclusion of the pressing operation, the air is released from pneumatic tubes 34, dropping the floating upper section 32 of the lower platen to its original position of FIG. 5. Cylinder 60 again may be actuated, driving the platen unit outside of the press. The plastic sheet-loading rack and lamp rack then may be retracted; the platen unloaded; and a new load placed on the platen in the manner described above.

In the event that panels having raised, curved, no-drip side margins are to be prepared, the foregoing procedure is modified to the extent that spacing blocks 48 are so positioned that the panel extends beyond the side of the press, as indicated in FIG. 9. The sequence of operations described above then is substantially the same, except that it includes the step of ironing the edge portion of the plastic sheet over the edge of the underlayment using ironing bar 128. This operation is effectuated simply by extending cylinder 136, whereupon the heated, resiliently-mounted contact plate 130 irons the plastic sheet about the underlayment and, upon inflation of pneumatic tube 132, applies clamping pressure for a period sufficient to set the adhesive.

The versatility of the apparatus further is evidenced in that it may be applied readily to the production of panel units provided with an upright splash board. The manner in which this is accomplished is illustrated in FIGS. 11 and 12.

In this important modification of the invention, underlayment panels 140 are formed with a V groove 142 at the predetermined point of inflection determining the rise of the back splash. This groove normally is formed by providing two underlayment panels each of which has a beveled edge 144 merging with a squared edge 146. The degree of bevel will determine the angular relation between the horizontal section and the splash board section of the final panel. Normally, of course, it is desired to fix this angle at precisely 90° and in this case the edges are beveled at 45°, creating an included angle of 90°.

The assemblies are loaded into the press and covered with plastic sheets 148 in the manner described above to produce a panel having the arrangement illustrated in FIG. 11. This is converted to the end product provided with a splash board by applying to its plastic surface, opposite recess 142, a conventional forming bar of the desired radius. This shapes the panel to the configuration of FIG. 12.

Thereupon there is inserted in the resultant opening a coved strip indicated generally at 150 and of characteristic shape. Thus it includes an arcuate surface 152 the arc of which conforms to the radius of the curved section of plastic sheet 148. It also includes parallel side edges 154 which, when the included angle of recess 142 of the original assembly is exactly 90°, will position the splash board at exactly right angles to the horizontal section of the panel. Angled surfaces 156 then meet squared edges 146, while surface 158 forms a beveled corner in the finished product.

In the application of cove strip 158, surfaces 152, 154 and 156 are coated with a suitable adhesive after which the strip is inserted in the opening between the two sections of the panel. Thereupon the resilience of the plastic sheet covering 148 assists in applying clamping pressure to the cove strip until the adhesive has set.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. Press apparatus comprising:
    (a) platen press means including upper and lower platens positioned for receiving between them an assembly to be pressed,
    (b) track means supporting the lower platen and extending beyond the apparatus,
    (c) drive means connected to the lower platen for reciprocating it on the track means between a working position within the press and a loading position outside the same, and
    (d) loading rack means stationed above the lower platen in its loading position and comprising a horizontal frame pivotally connected to the upper platen a plurality of spaced parallel horizontal rods connected to the frame at their outer ends only and lying in a plane above the plane of the working surface of the lower platen, and drive means connected to the frame for moving it angularly between working and retracted positions.

2. Apparatus for forming sheet plastic and laminating it to an undelayment which comprises:
    (a) platen press means including upper and lower platens positioned for receiving between them an assembly including an underlayment and a plastic sheet to be glued thereto,
    (b) one of the platens having across its working surface a plurality of rows of spacing elements positioned for locating the underlayment thereon,
    (c) said one of the platens being formed in two superimposed relatively collapsible sections, the section adjacent the other platen being formed with spaced slots, a channel member being mounted in each slot and secured to the other section, the channel being adapted to receive the spacing elements in selected positions of adjustment.

3. Apparatus for forming sheet plastic and laminating it to an underlayment which comprises
    (a) platen press means including upper and lower platens positioned for receiving between them an assembly including an underlayment and a plastic sheet to be glued thereto,
    (b) one of the platens having across its working surface a plurality of rows of spacing elements positioned for locating the underlayment thereon,
    (c) the spacing elements having centrally located posts extending upwardly therefrom for locating the plastic sheet in overlapped relation to the underlayment.

4. The apparatus of claim 3 wherein said one of the platens is formed in two superimposed relatively collapsible sections, the section adjacent the other platen being formed with spaced slots, a channel member being mounted in each slot and secured to the other section, the channel being adapted to receive the spacing elements in selected positions of adjustment.

5. Apparatus for forming sheet plastic and laminating it to an underlayment which comprises
    (a) platen press means including upper and lower platens positioned for receiving between them an assembly including an underlayment and a plastic sheet to be glued to the underlayment,
    (b) one of the platens having across its working surface a plurality of rows of spacing elements positioned for locating the underlayment thereon,
    (c) the spacing elements having extending outwardly from their outer surfaces posts positioned for locating the plastic sheet in overlapped relation to the underlayment,
    (d) means for retracting the spacing elements relative to said working surface during closure of the press, thereby leaving an aperture adjacent the underlayment, and
    (e) plastic sheet forming means secured to the other of the platens and positioned for entering the aperture left by retraction of the spacing elements.

6. The apparatus of claim 5 wherein the forming means comprises a hollow tube encased in a resilient sheath, port means for introducing compressed air into the hollow tube, and vents through the hollow tube behind the rubber sheath for expanding the same into pressure contact with the formed plastic sheet.

7. The apparatus of claim 5 wherein the forming means comprises a hollow tube encased in a resilient sheath, port means for introducing compressed air into the hollow tube, vents through the hollow tube behind the rubber sheath for expanding the same into pressure contact with the formed plastic sheet, and a plate fastened the length of the tube centrally of the sheath for confining the direction of expansion of the same to a lateral direction.

8. Apparatus for forming sheet plastic and laminating it to an underlayment which comprises,
    (a) platen press means including upper and lower platens positioned for receiving between them an assembly comprising an underlayment having a raised bull-nosed margin and a plastic sheet overlying the same,
    (b) the margin of the assembly extending outside the press,
    (c) and ironing means mounted adjacent the extending margin of the assembly, the ironing means including a pair of arms pivoted at one end to a frame member and an ironing bar fixed between the other ends of the arms and extending the length of the assembly adjacent the same, a contact plate fixed resiliently to the ironing bar, and drive means for moving the ironing bar and contact plate in ironing relation across the extending margin of the assembly, thereby pressing the overlying plastic sheet against the underlayment.

9. The apparatus of claim 8 wherein the resiliently mounted contact strip comprises a reversely bent strip of resilient metal fastened at one end to the ironing bar with the other end unattached and spaced therefrom, thereby forming a housing, and within the housing an inflatable pneumatic tube.

10. Press apparatus comprising:
    (a) platen press means including upper and lower platens positioned for receiving between them an assembly to be pressed, (b) track means supporting the lower platen and extending beyond the apparatus,
(c) drive means connected to the lower platen for reciprocating it on the track means between a working position within the press and a loading position outside the same,
(d) loading rack means stationed above the lower platen in its loading position, and
(e) heating means positioned above the loading rack means for heating selected areas of the work stationed thereon, the heating means comprising a frame mounted for angular movement, drive means connected to the frame for moving it angularly between advanced and retracted positions, and a plurality of elongated heating elements mounted on the frame at spaced intervals across the work.

References Cited by the Examiner

UNITED STATES PATENTS

| 1,469,511 | 10/1923 | Huebner | 100—295 X |
| 1,777,310 | 10/1930 | Hopkinson. | |
| 2,363,779 | 11/1944 | Duffy et al. | 100—269 X |
| 2,411,043 | 11/1946 | Klassen. | |
| 2,866,561 | 12/1958 | Groves | 18—16 X |
| 2,940,384 | 6/1960 | Munschauer et al. | 100—214 |
| 3,012,601 | 12/1961 | Lee | 156—583 |
| 3,076,229 | 2/1963 | Arpajian | 18—16 X |
| 3,111,100 | 11/1963 | Georgeff | 72—414 |
| 3,142,093 | 7/1964 | Tribett | 18—16 |

FOREIGN PATENTS

| 678,935 | 7/1939 | Germany. |
| 574,671 | 3/1958 | Italy. |

BILLY J. WILHITE, *Primary Examiner.*